US005479276A

United States Patent [19]
Herbermann

[11] Patent Number: 5,479,276
[45] Date of Patent: Dec. 26, 1995

[54] SUNLIGHT ENHANCED BACKLIGHT SYSTEM FOR COCKPIT DISPLAY

[75] Inventor: Carl R. Herbermann, Centerport, N.Y.

[73] Assignee: Northrop Grumman Corporation, Los Angeles, Calif.

[21] Appl. No.: 277,479

[22] Filed: Jul. 19, 1994

[51] Int. Cl.⁶ .......................... G02F 1/133; B64D 47/02; F21V 8/00
[52] U.S. Cl. ................ 359/048; 359/42; 359/40; 359/69; 362/32; 362/62
[58] Field of Search ................. 359/42, 48, 40, 359/69; 362/26, 31, 32, 62, 80.1, 330

[56] References Cited

U.S. PATENT DOCUMENTS

| 3,966,303 | 6/1976 | Yamamoto | 359/42 |
| 4,310,871 | 1/1982 | Adachi | 359/42 |
| 4,367,923 | 1/1983 | Ishikawa | 359/40 |
| 4,621,306 | 11/1986 | Sell | 362/31 |
| 4,885,663 | 12/1989 | Parker | 362/32 |
| 5,121,232 | 6/1992 | Miyadera | 359/42 |

FOREIGN PATENT DOCUMENTS

| 62-14624 | 1/1987 | Japan | 359/42 |
| 63-91629 | 4/1988 | Japan | 359/42 |

Primary Examiner—William L. Sikes
Assistant Examiner—Tai V. Duong
Attorney, Agent, or Firm—Terry J. Anderson; Karl J. Hoch, Jr.

[57] ABSTRACT

An objective lens is mounted to the lower exterior portion of a canopy to focus sunlight into an attached fiber optic bundle. The bundle then carries the light a relatively short distance to an instrument panel where it may be disbursed at a diffuser for projection through an LCD. The readability of the display becomes enhanced when sunlight causes the greatest visual interference with a pilot's vision.

3 Claims, 1 Drawing Sheet

SUNLIGHT ENHANCED BACKLIGHT SYSTEM FOR COCKPIT DISPLAY

FIELD OF THE INVENTION

The present invention relates to aircraft displays, and more particularly to an enhanced backlighting system for such displays.

BACKGROUND OF THE INVENTION

One of the most difficult cockpit display lighting conditions exists when aircraft attitudes place the sun at the pilots 12 O'clock position, causing his/her iris to close and making it very difficult for them to read instrument panel LCD's. To compensate for this, display manufacturers have, to date, installed high intensity backlights. This requirement drives the power requirements, thermal management and overall system reliability. Additionally, the operator must continually adjust the backlight intensity based on aircraft and sun positions as well as atmospheric conditions.

BRIEF DESCRIPTION OF THE PRESENT INVENTION

This invention implements a display backlighting approach which makes use of ambient sunlight to augment the intensity of the required cockpit display backlight systems. This concept incorporates an objective lens which could be molded into the lower portion of the canopy to focus the sunlight into a fiber optic ribbon connector. The fiber ribbon would then carry the light a short distance to the instrument panel where it would be disbursed at a diffuser/combiner for projection through the LCD. This would not only allow a reduction in the amount of required active backlight by 80%, but would provide autoregulation as the amount of ambient light diminished or the aircraft/sun positions diverged from 180°.

This invention additionally advances the state of the art in terms of available brightness. Assuming 10,000 ft candles incident upon a 25 in$^2$ lens, and a conservative transmission efficiency of 40%, the brightness when disbursed over a 64 in$^2$ display would be on the order of 2000 ftL.

To date, the backlight sources have proven to be the limiting factor in display systems reliability. As there are no active components to the present approach, the system reliability will be significantly increased.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
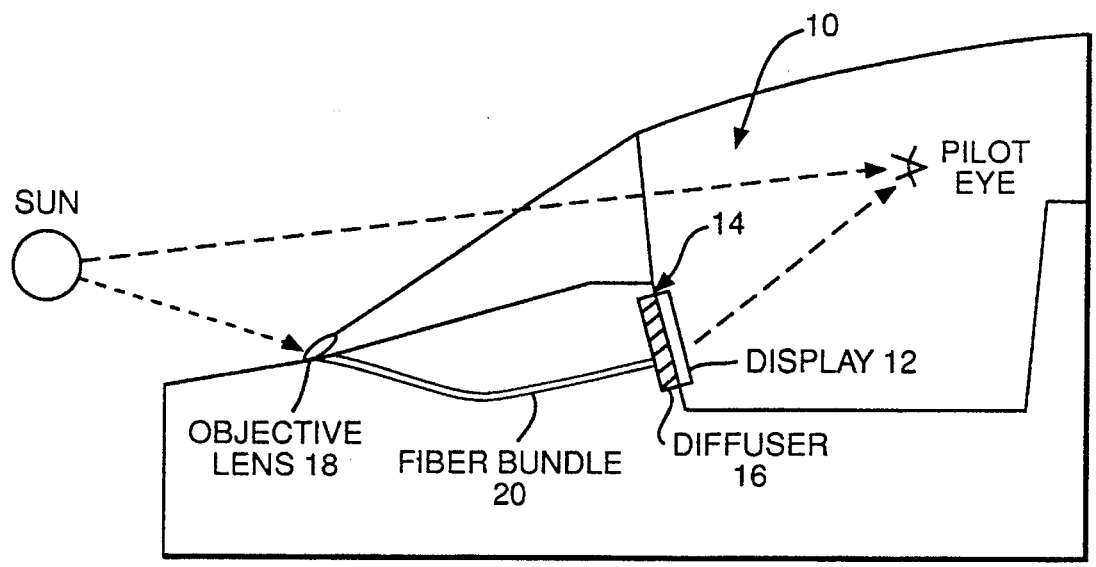
FIG. 1 is a diagrammatic view of the present invention as installed in a cockpit display system.

Referring to FIG. 1, a cockpit 10 is diagrammatically illustrated with a conventional display 12 mounted to the display panel 14 of the cockpit, the display presenting information to a pilot. Conventionally, the display 12 is of the LCD type and a light diffuser 16 diffuses light from backlighting lamps for making the LCD information readable. Nominal light output is acceptable at night where steady ambient light conditions exit. However, during daytime, conventional light from backlighting lamps must be adjusted, depending upon the direction of incident sunlight which directly affects readability, as mentioned.

Figure 2:
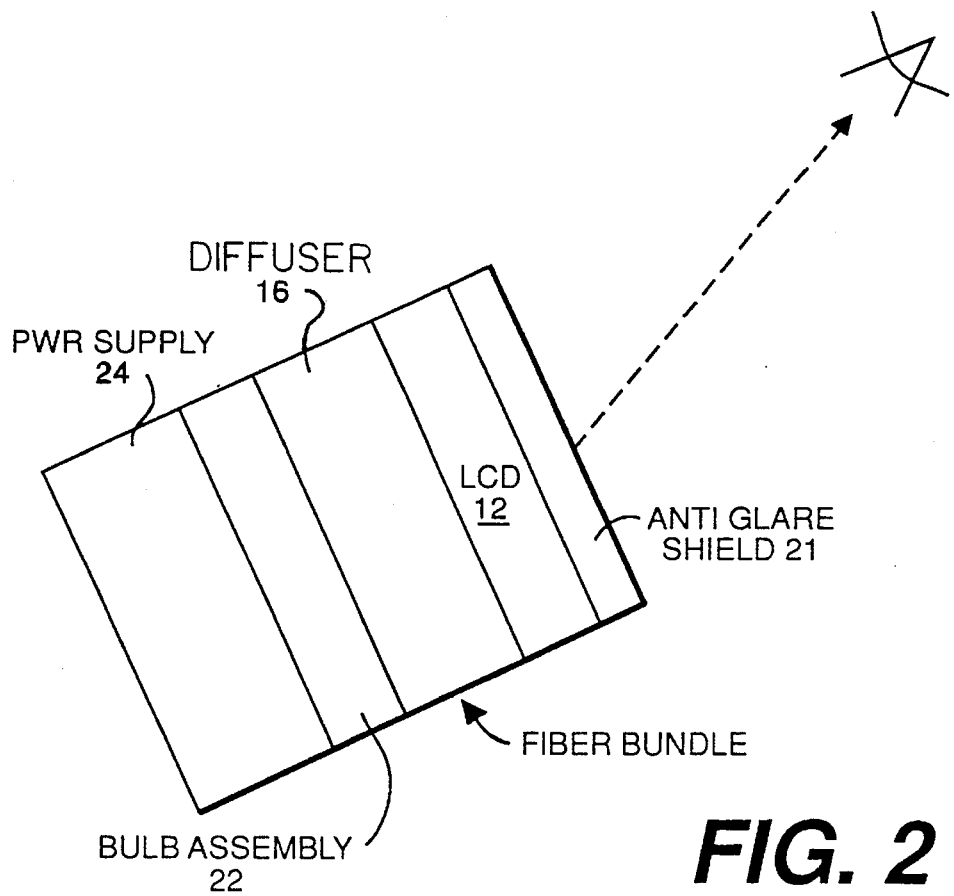
FIG. 2 is a perspective view of the display portion of the present invention.

FIG. 2 illustrates the conventional stacking of cockpit display components which normally include a front antiglare shield 21, followed by the LCD 12, diffuser 16, a bulb assembly 22, and finally a power supply 24. A main purpose of the present invention is to allow greater backlighting of the display during visual sun interference - without necessitating more lamps or a larger power supply.

This is accomplished, in the present invention, by utilizing sunlight as a primary illumination source. Referring to FIG. 1, there will be seen an objective lens 18 mounted on the nose cone of an aircraft, typically at the base line of the canopy windshield. The objective lens collects sunlight and a fiber optic bundle 20 transmits the light to the side edges of diffuser 16, as diagrammatically indicated in FIG. 2. The angular orientation of lens 18 is such that it collects the greatest level of incident light when the sun is positioned forwardly of the pilot and at a shallow angle that interferes most with the pilot's vision. In such a situation, the iris of the pilot's eye closes down and therefore makes the displayed information less readable. However, with the objective lens properly positioned, sufficient light is diffused through the diffuser 16 so that the displayed information becomes increasingly backlit. Of course, the enhanced backlighting is inoperative during non-daylight hours, but the problem of sunlight interference is absent. During these non-daylight hours of aircraft operation, the LCD becomes backlit by a bulb assembly 22 (FIG. 2) in a conventional fashion.

This concept incorporates an objective lens which could be molded into the lower portion of the canopy to focus the sunlight into a fiber optic ribbon connector. The fiber ribbon would then carry the light a short distance to the instrument panel where it would be disbursed at a diffuser/combiner for projection through the LCD. This would not only allow a reduction in the amount of required active backlight by 80%, but would provide autoregulation as the amount of ambient light diminished; or the aircraft/sun positions diverged from 180°.

This invention additionally advances the state of the art in terms of available brightness. Assuming 10,000 ft candles incident upon a 25 in$^2$ lens, and a conservative transmission efficiency of 40%, the brightness when disbursed over a 64 in$^2$ display would be on the order of 2000 ftL.

As will be appreciated from an understanding of the discussed invention, an apparatus is presented which implements a display backlighting approach which makes use of ambient sunlight to augment the intensity of required cockpit display backlighting. This is achieved without increasing the normal bulb backlighting assembly, nor its power supply. Further, the present system requires no moving parts so that reliability is extremely high; and no valuable space need be taken for the invention - within the cockpit.

It should be understood that the invention is not limited to the exact details of construction shown and described herein for obvious modifications will occur to persons skilled in the art.

I claim:

1. A cockpit display system comprising:

a lens mounted to the cockpit for focusing incident sunlight;

fiber optic means connected at a first end thereof to the lens for conducting sunlight therefrom;

means mounted to a cockpit instrument panel for diffusing light;

a second end of the fiber optic means connected to the light diffusing means for diffusing conducted light; and a liquid crystal display (LCD) mounted in front of the diffusing means to be backlit by diffused conducted light;

wherein the lens is integrally molded into a lower canopy portion.

2. A cockpit display system comprising:

a lens mounted to the nose cone of an aircraft, at the external base line of a cockpit canopy windshield, and at an angular orientation for collecting the greatest level of incident light when the sun is positioned forwardly of a pilot and at a shallow angle that interferes most with the pilot's vision, the lens focusing incident sunlight;

fiber optic means connected at a first end thereof to the lens for conducting sunlight therefrom;

means mounted to a cockpit instrument panel for diffusing light;

a second end of the fiber optic means connected to the light diffusing means for diffusing conducted light; and a liquid crystal display (LCD) mounted in front of the diffusing means to be backlit by diffused conducted light.

3. A cockpit display system as set forth in claim 2 wherein:

the fiber optic means comprises a fiber bundle, secured at the second end thereof, to edges of the diffusing means;

the display system further comprising lamp means located behind the diffusing means for backlighting the LCD.

* * * * *